(12) United States Patent
Straka

(10) Patent No.: US 6,196,820 B1
(45) Date of Patent: Mar. 6, 2001

(54) DEVICE FOR FILTERING PLASTICS IN INJECTION MOLDING MACHINES

(75) Inventor: Rudolf Straka, Nürnberg (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/267,479

(22) Filed: Mar. 11, 1999

(30) Foreign Application Priority Data

Mar. 11, 1998 (DE) .............................................. 198 11 273

(51) Int. Cl.$^7$ ................................................. B29C 45/17
(52) U.S. Cl. ........................... 425/84; 210/184; 210/186; 210/236; 210/447; 425/197; 425/199
(58) Field of Search ................ 425/84, 85, 197, 425/198, 199; 210/184, 186, 236, 447

(56) References Cited

U.S. PATENT DOCUMENTS

| | | | |
|---|---|---|---|
| 3,962,092 | * | 6/1976 | Newman, Jr. ......................... 210/236 |
| 4,167,384 | * | 9/1979 | Shirato et al. ......................... 425/199 |
| 4,814,186 | * | 3/1989 | Trott ..................................... 425/199 |
| 5,090,887 | * | 2/1992 | Gneuss ................................. 425/199 |
| 6,010,625 | * | 6/1976 | Whitman .............................. 425/199 |

FOREIGN PATENT DOCUMENTS

4419284 * 10/1995 (DE) .

* cited by examiner

*Primary Examiner*—Tim Heitbrink
(74) *Attorney, Agent, or Firm*—Cohen, Pontani, Lieberman & Pavane

(57) ABSTRACT

A process and a corresponding device for filtering plastics in an injection molding machine having a plasticizing unit and a mold cavity. A slide having a receptacle for a filter element is arranged between the plasticizing unit and the mold cavity. A piston cylinder displacing unit is mounted parallel to a principal axis of the plasticizing unit so as to be slideably contactable by the slide holding the filter element. The displacement unit has a filter holder surrounded by a filter preheater for the insertion and preheating of a fresh filter element. The slide is displaced so that the filter receptacle in the slide corresponds to the filter holder in the displacement unit thereby enabling a spent filter element to be ejected while simultaneously inserting the fresh filter element into the receptacle. The slide is then returned to its operating position in which the filter element is acted upon by the plastic casting substance. A blocking member, for example a three-way cock, is arranged in the connection line after the slide. The blocking member can either prevent the flow of the plastic casting substance from the plasticizing unit to the mold cavity, permit the flow of the plastic substance to the mold cavity or flush the casting substance into an off injection receptacle via a branch line.

14 Claims, 3 Drawing Sheets

DEVICE FOR FILTERING PLASTICS IN INJECTION MOLDING MACHINES

BACKGROUND OF THE INVENTION

1. Field of the Invention

The present invention is directed to a process and a corresponding device for filtering plastics in an injection molding machine in which a holding device receiving a filter element is arranged between a plasticizing unit and a mold cavity.

2. Description of the Related Art

Kunststoffe [Plastics] 87 (1997), pages 154–159, discloses a screen system (page 156) in which the screening locations are arranged in a rectangular slide (cassette) or a round bolt. Changing is initiated manually or automatically via a hydraulic drive when a defined pressure limit is reached by displacing the screen surface carrier.

Screen changing systems of the above-mentioned type are used in plastics processing and, in this case, especially in extrusion. Problems occur in this respect precisely in changing systems which are not expressly constant with respect to pressure, since the continuous insertion and exchange of the screen surface involves sometimes enormous pressure fluctuations in front of the filter.

German reference DE 44 19 284 C1 discloses a filter device for plastic melts in which screen inserts are arranged in a power-operated displaceable slide. Seals are arranged at both sides of the slide, wherein at least one of the seals has a sealing body made of metal which encloses a hollow space that is filled with a substance whose thermal expansion coefficient exceeds that of the material of the sealing body. When the seal is inserted, its sealing body which is made of metal, for example, high-grade steel, is relaxed in practice. As a result of heating by the plastic melt flowing through, the sealing body, including the material with which it is filled, expands thermally so that the end face of the seal lies firmly against the slide in a sealing manner during operation after the thermal expansion or deformation.

A disadvantage in this type of seal is its dependence on the pressure and on the temperature of the processed plastic substance such that at low pressure and low temperature leaks occur and at high pressure and high temperature undesirably high area pressing occurs in the support surfaces.

SUMMARY OF THE INVENTION

It is an object of the present invention to provide a process and a corresponding device for filtering plastic in an injection molding machine having a plasticizing unit and a mold cavity in which it is ensured that extraneous materials are reliably removed from the plastic substance at high substance pressures by a filter element changeable by means of a simple construction.

According to an embodiment of the present invention, a preheated filter element is used when changing filters, wherein the preheated filter element is acted upon by the plastic substance which is kept away from the mold cavity until the cast substance is determined as suitable and is accordingly supplied without defects for processing.

For this purpose, there is provided in a connection line, between the plasticizing unit and a nozzle connected with the mold cavity, a 3-way cock with the following operating positions:

through to the mold cavity located in a die or tool;
blocking position; and
flushing position with outward substance flow, preferably downward.

In the blocking position a blocking member prevents any influencing of the filter and of the screw out of the tool or distributor system, e.g., hot channel in the case of multiple components, and the like.

The flushing position sprays out air volume and old material after changing the filter units, particularly when starting the injection molding machine and when changing filters.

Moreover, according to the present invention, a preheating device is provided so as to preheat fresh filter elements. For this purpose, a filter holder is provided as a slide in which the active filter is mounted. The slide is displaceable and movable into a position in which its receptacle for the filter element corresponds with a piston-shaped displacing unit by means of which a spent filter element is ejected and a fresh filter element simultaneously inserted.

The displacing unit has, in the region of the filter holder, the preheating device by means of which the filter elements are preheated to operating temperature. The preheating advantageously prevents the plastic substance from solidifying in the fresh filter at a next injection stroke, which would cause an interruption in production.

To change filters, the slide is arranged as a carrier plate by which the spent filter is pulled out of the filter holder from the top. The preheated filter element is slid into the carrier plate by means of the piston of the displacing unit. In so doing, the spent filter element is ejected away from the displacing unit into a collection channel or gutter.

In an advantageous further embodiment of the invention, the filter element is also thermally influenced with respect to its operating position. For this purpose, a filter heater is provided in the slide in a region in which the filter element is received.

Although it is desirable that the slide receiving the filter element be easily movable for changing, it is also desirable that the slide be held in a tightly closing manner during operation so as not to allow leakage. For this purpose, it is known to provide sealing rings on both sides of the slide.

In another embodiment of the present invention, a sealing ring which comprises at least two parts is provided between the slide and the housing on a side of the slide directed toward the plasticizing unit. The sealing ring is either free of play or is pressed against the slide depending on substance pressure present in the plasticizing unit channel. For this purpose, one seal part of the sealing ring is roof-shaped, while another seal part has a triangular shape, wherein both seal parts contact one another along an inclined surface. Both seal parts are made exclusively of metal, wherein at least the roof-shaped sealing ring is preferably manufactured from a highly-elastic material. In a pressureless state, both sealing rings are sprung back and lean lightly against one another in a pretensioned manner. As substance pressure increases, the diameter increases with respect to the roof-shaped sealing ring. As the roof-shaped seal part expands radially outward the sloping surface which is inclined toward the triangular sealing ring moves the triangular sealing ring axially and presses it against the slide. The angle of the contacting inclined surfaces of the two seal parts is selected in such a way that these seal parts do not jam and they spring back into their initial position in the pressureless state.

In a preferred embodiment of the present invention a metal with a low modulus of elasticity is used so as to promote the required deformation.

In a further advantageous embodiment of the present invention, the blocking member provided in the connection line is a 3-way cock that can be connected with an accumulator. The injection molding substance that has been found to be of good quality is additionally influenced with respect to its pressure and its quantity by this accumulator. For this purpose, the accumulator is a piston-cylinder unit which is hydraulically or electrically driven. The piston-cylinder unit has a piston rod and which is thermally separated from the injection molding substance, so that the injection molding substance is not negatively influenced.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
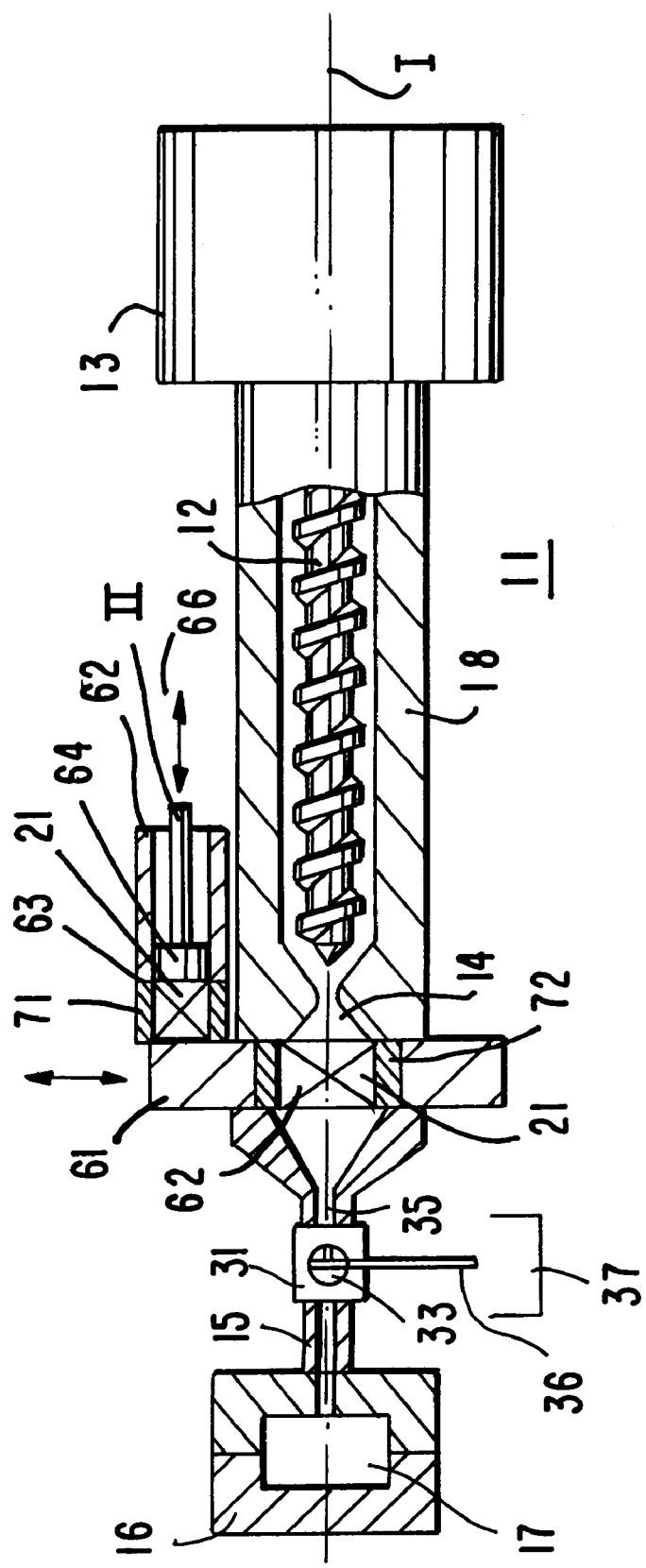
FIG. 1 shows a diagram of an injection molding unit incorporating the present invention.

FIG. 1 shows an injection molding unit with a plasticizing unit 11 having a housing 18 and a screw 12 driven in the housing 18 via a screw drive 13. The housing 18 has, at its outlet side, a channel 14 which communicates with a nozzle 15 via a connection line 35, so that an injection molding material driven by the screw 12 is guidable through the nozzle 15 to a mold cavity 17 arranged in a tool 16.

A slide 61 having a receptacle 62 for a filter element 21 is arranged in a region of the channel 14 so as to be movable perpendicular to a principal axis I of the plasticizing unit 11.

A filter heating device 72 encloses the receptacle 62 for the purpose of heating the filter element 21.

The slide 61 corresponds in a filter changing position with a piston-shaped displacing unit 66 having a piston-cylinder unit 64 and a secondary axis II arranged parallel to the principal axis I of the plasticizing unit 11. A filter holder 63, into which a fresh filter element 21 is insertable, is arranged in an outlet area of the displacing unit 66.

In order to change filters, the center of the receptacle 62 is displaced from the principal axis I of the plasticizing unit 11 to the secondary axis II of the displacing unit 66. The fresh filter element 21 is moved out of the filter holder 63 into the receptacle 62 of the slide 61 by movement of the piston-cylinder unit 64 which simultaneously ejects the spent filter element (not shown here) from the slide 61.

A preheating device 71 is arranged at the filter holder 63 to bring the fresh filter element 21 to a desired operating temperature.

The fresh filter elements 21 are fed via a magazine 65 connected with the filter holder 63.

A positionable blocking member 31, preferably a 3-way cock 33, is arranged in the connection line 35 downstream of the slide 61 and the filter 21. In one position (through) of the blocking member 31, the channel 14, and, therefore, filtered injection molding material, is in communication with the mold cavity 17; in a second position (divert), the channel 14 is connected with an off-injection receptacle 37 via a branch 36; and in a third position (block) both the connection line 35 and the branch 36 are blocked.

Figure 2:
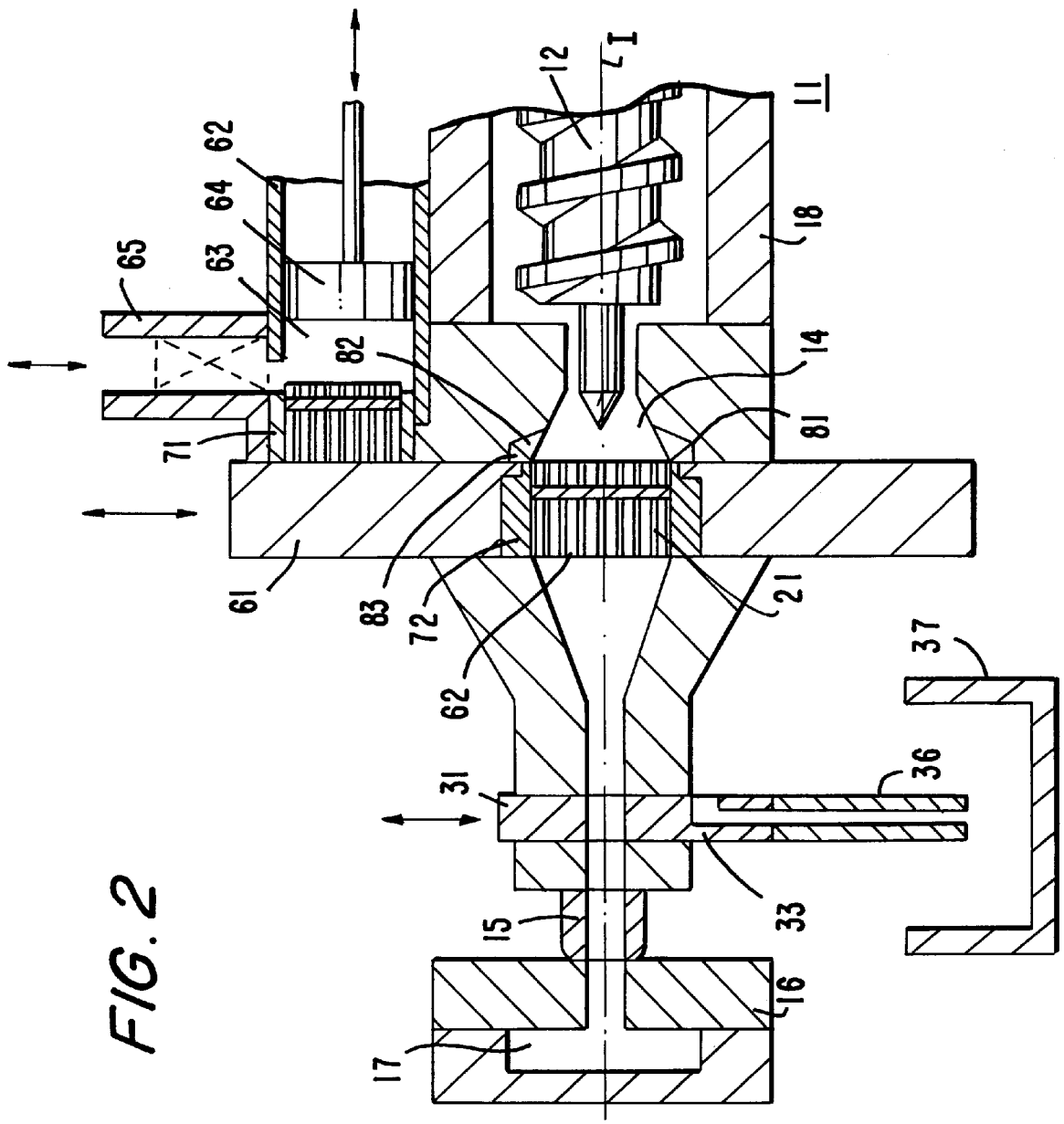
FIG. 2 shows a portion of the injection molding unit with a filter changing and blocking device.

FIG. 2 shows a portion of FIG. 1 in a region of the slide 61 and the blocking member 31. In this Figure the blocking member 31 is constructed as a slide member with the positions: through, block and divert, as in the case of the 3-way cock 33, above.

A sealing ring 81 is in contact with the slide 61 and the housing 18. The sealing ring 81 comprises two seal parts, namely a roof-shaped seal part 82 and a triangular seal part 83 which slideably contact one another over an entire surface.

Internal pressure of the injection molding material located in the channel 14 expands the roof-shaped part 82 radially thereby forming, a wedge-shaped connection with the contact surface of the triangular seal part 83. The triangular seal part 83 is therefore pressed with high force against the slide 61. In this way, plastic substance is reliably prevented from flowing out of the channel 14 over the contact surfaces of the housing 18 and the slide 61.

Figure 3:
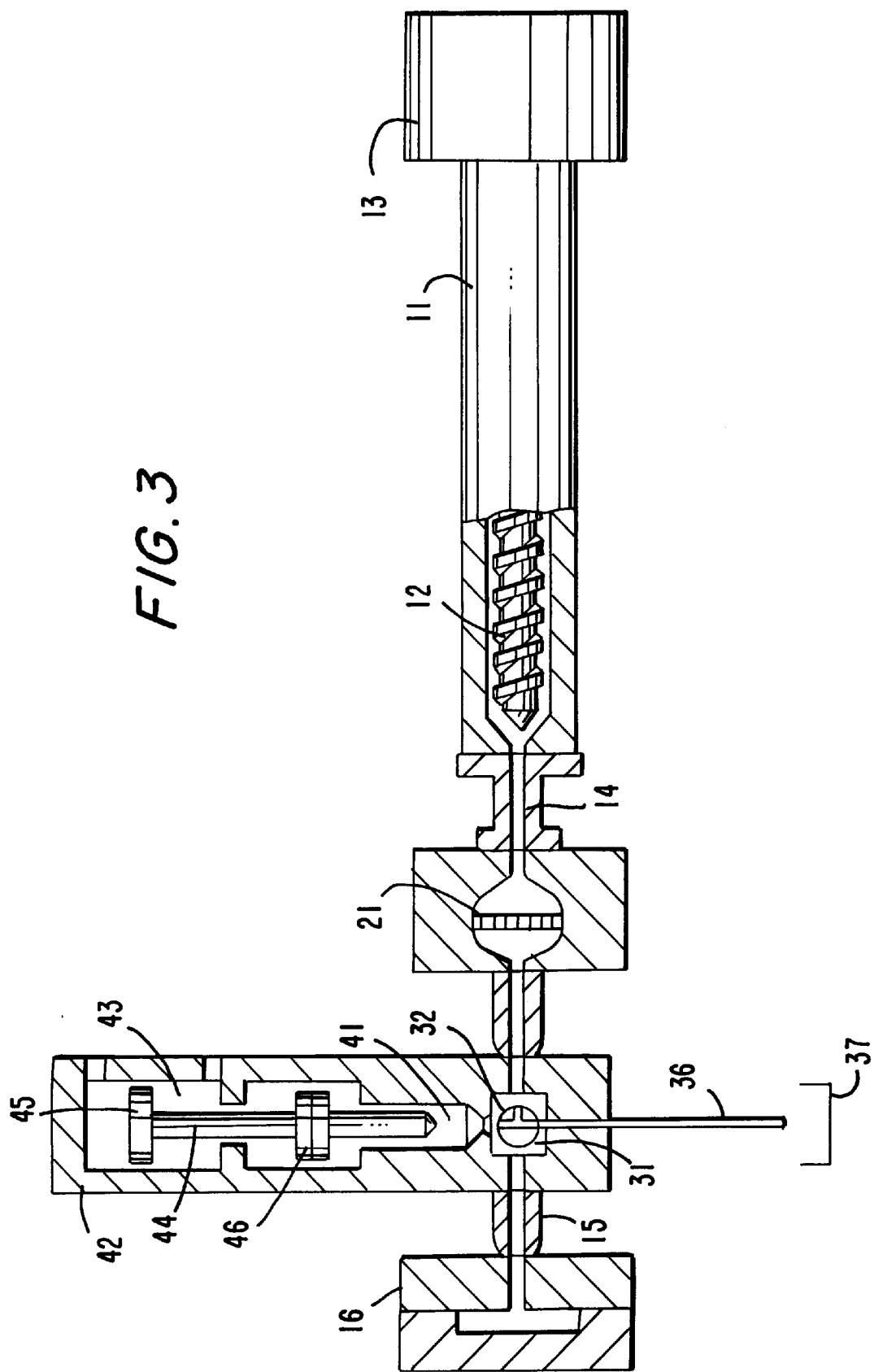
FIG. 3 shows the injection molding unit with a filter and accumulator.

FIG. 3 shows an injection molding unit in which an accumulator 41 communicates with the blocking member 31 for supplementing the branch 36.

The accumulator 41 has an adjusting element 42 configured as a piston-cylinder unit 43 having a piston rod 44 connectable (not shown) to a hydraulic drive or an electric drive.

A material 46 is arranged in an area of the piston rod 44 so as to thermally separate the piston 45 from the drive, to prevent adversely influencing the temperature of the injection molding material.

The invention is not limited by the embodiments described above which are presented as examples only but can be modified in various ways within the scope of protection defined by the appended patent claims.

What is claimed is:

1. A device for filtering a plastic casting substance in an injection molding machine having a plasticizing unit and a mold cavity, the plasticizing unit having a channel with an outlet, the device comprising: a nozzle arrangeable at the mold cavity; a connection line connecting the nozzle to the channel; a slide arranged in the connection line between the plasticizing unit and the nozzle, the slide having a receptacle for holding a filter element and being displaceable perpendicular to a principal axis of the connection line; a piston-shaped displacing unit having an axis parallel to the principal axis of the connection line, the piston-shaped displacing unit having a filter holder in which a fresh filter element is insertable; preheating means arranged in a region of the filter holder for preheating the fresh filter element, the slide being displaceable into a position in which the receptacle for the filter element corresponds with the piston-shaped displacing unit enabling the filter element to be ejected and the fresh filter element to be simultaneously inserted; a blocking member movably arranged in the connection line downstream of the filter element receptacle in a direction of travel of the plastic casting substance so as to selectively block and allow the casting substance to flow in the connection line; an off-injection receptacle positioned proximal to the blocking member; and a branch line arranged at the connection line so that in one position of the blocking member the plasticizing unit communicates with the off-injection receptacle via the branch line.

2. The device according to claim 1, herein the blocking member is a three-way cock.

3. The device according to claim 1, herein the blocking member is a slide member.

4. The device according to claim 1, further including filter heating means arranged in the slide proximal to the receptacle of the filter element for thermally influencing the casting substance.

5. The device according to claim 1, further including a sealing ring having at least two seal parts arranged at an outlet of the channel adjacent to the receptacle of the filter element on a side of the channel inclined toward the plasticizing unit, so as to be pressable against the slide in dependence upon a pressure of the casting substance in the channel.

6. The device according to claim 3, wherein a first one of the seal parts is roof-shaped and a second one of the seal parts is triangular shaped, one side of the roof-shaped seal part being supported at the housing and another side of the roof-shaped seal part being slideably supported at a side of the triangular seal part, two remaining sides of the triangular seal part contacting the housing and the slide, respectively.

7. The device according to claim 4, wherein the sealing ring is titanium.

8. The device according to claim 2, wherein the three-way cock is a ball valve, and further comprising an accumulator connectable with the ball valve and having adjusting means for controlling the ball valve, and volume and pressure in the accumulator in a predetermined manner.

9. The device according to claim 8, wherein the accumulator is a piston-cylinder unit having a piston rod and a piston.

10. The device according to claim 9, further including a hydraulic drive driveably connected to the piston rod of the piston-cylinder unit.

11. The device according to claim 9, further including an electric drive driveably connected to the piston rod of the piston-cylinder unit.

12. The device according to claim 10, further including a material arranged in an area of the piston rod so as to thermally separate the piston from the drive.

13. The device according to claim 11, further including a material arranged in an area of the piston rod so as to thermally separate the piston from the drive.

14. A device for injection molding a plastic casting substance, comprising: a plasticizing unit and a mold cavity, the plasticizing unit having a channel with an outlet; a nozzle arrangeable at the mold cavity; a connection line connecting the nozzle to the channel; a slide arranged in the connection line between the plasticizing unit and the nozzle, the slide having a receptacle for holding a filter element and being displaceable perpendicular to a principal axis of the connection line; a piston-shaped displacing unit having an axis parallel to the principal axis of the connection line, the piston-shaped displacing unit having a filter holder in which a fresh filter element is insertable; preheating means arranged in a region of the filter holder for preheating the fresh filter element, the slide being displaceable into a position in which the receptacle for the filter element corresponds with the piston-shaped displacing unit enabling the filter element to be ejected and the fresh filter element to be simultaneously inserted; a blocking member movably arranged in the connection line downstream of the filter element receptacle in a direction of travel of the plastic casting substance so as to selectively block and allow the casting substance to flow in the connection line; an off-injection receptacle positioned proximal to the blocking member; and a branch line arranged at the connection line so that in one position of the blocking member the plasticizing unit communicates with the off-injection receptacle via the branch line.

\* \* \* \* \*